(12) United States Patent
Ponnapalli et al.

(10) Patent No.: US 11,556,403 B1
(45) Date of Patent: Jan. 17, 2023

(54) SYSTEM AND METHOD FOR AN APPLICATION PROGRAMMING INTERFACE (API) SERVICE MODIFICATION

(71) Applicant: Bank of America Corporation, Charlotte, NC (US)

(72) Inventors: Bhargavi Ponnapalli, Telangana (IN); Gayathri Jawahar, Tamil Nadu (IN); Sowjanya Kanthamneni, Andhra Pradesh (IN); Madhusudhanan Krishnamoorthy, Tamil Nadu (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 17/504,615

(22) Filed: Oct. 19, 2021

(51) Int. Cl.
 *G06F 9/54* (2006.01)
 *G06F 3/14* (2006.01)
 *G06F 1/16* (2006.01)
 *G06F 9/48* (2006.01)

(52) U.S. Cl.
 CPC ............ *G06F 9/547* (2013.01); *G06F 9/4881* (2013.01)

(58) Field of Classification Search
 None
 See application file for complete search history.

(56) References Cited

U.S. PATENT DOCUMENTS

| 7,606,741 | B2 | 10/2009 | King et al. |
| 7,962,750 | B1 | 6/2011 | Gruse et al. |
| 8,181,021 | B2 | 5/2012 | Ginter et al. |
| 8,370,362 | B2 | 2/2013 | Szabo |
| 8,429,751 | B2 | 4/2013 | Mizrahi et al. |
| 8,635,272 | B2 | 1/2014 | Reisman |
| 8,671,021 | B2 | 3/2014 | Maharajh et al. |
| 8,707,261 | B2 | 4/2014 | Heller et al. |
| 8,856,289 | B2 | 10/2014 | Ansari et al. |
| 8,908,666 | B2 | 12/2014 | Nixon et al. |
| 8,918,599 | B2 | 12/2014 | Tseng et al. |
| 8,994,591 | B2 | 3/2015 | Dupray et al. |
| 8,996,572 | B2 | 3/2015 | Wakefield |
| 9,063,788 | B2 | 6/2015 | Gedik et al. |
| 9,083,581 | B1 | 7/2015 | Addepalli et al. |
| 9,210,100 | B2 | 12/2015 | Van Der Linden et al. |
| 9,237,110 | B2 | 1/2016 | Decusatis et al. |

(Continued)

*Primary Examiner* — Umut Onat

(57) ABSTRACT

A system for implementing an application programming interface (API) service modification generates API sample requests based on content and metadata associated with historical API requests. The content associated with a historical API request may comprise data that is requested in the historical API request. The metadata may comprise a data format associated with the content. The system sends the API sample requests to an API hosting server and receives API responses. The system compares an API response with an expected API response, where the API response and the expected API response are associated with a particular task. The system determines whether the API response corresponds with the expected API response. If it is determined that the API response does not correspond with the expected API response, the system identifies a modification made to the API response and modifies future API requests associated with the particular task according to the modification.

20 Claims, 3 Drawing Sheets

(56) References Cited

U.S. PATENT DOCUMENTS

| | | |
|---|---|---|
| 9,270,709 B2 | 2/2016 | Shatzkamer et al. |
| 9,390,375 B2 | 7/2016 | Allgaier |
| 9,507,346 B1 | 11/2016 | Levinson et al. |
| 9,612,123 B1 | 4/2017 | Levinson et al. |
| 9,734,455 B2 | 8/2017 | Levinson et al. |
| 9,800,420 B2 | 10/2017 | Bertorelle et al. |
| 9,838,375 B2 | 12/2017 | Taine et al. |
| 9,910,721 B2 | 3/2018 | Wu et al. |
| 9,964,981 B2 | 5/2018 | Imes et al. |
| 10,002,337 B2 | 6/2018 | Siddique et al. |
| 10,229,274 B2 | 3/2019 | Kandek et al. |
| 10,248,119 B2 | 4/2019 | Kentley-Klay et al. |
| 10,401,852 B2 | 9/2019 | Levinson et al. |
| 10,446,037 B2 | 10/2019 | Kentley-Klay et al. |
| 10,657,259 B2 | 5/2020 | Lee et al. |
| 10,712,750 B2 | 7/2020 | Kentley-Klay et al. |
| 10,805,175 B2 | 10/2020 | Stocker |
| 10,824,549 B1 * | 11/2020 | Desphande ............ G06N 20/00 |
| 10,832,502 B2 | 11/2020 | Levinson et al. |
| 10,921,811 B2 | 2/2021 | Levinson et al. |
| 10,976,923 B2 | 4/2021 | Gnedin et al. |
| 10,990,516 B1 * | 4/2021 | Merritt .................... G06N 20/00 |
| 11,022,974 B2 | 6/2021 | Levinson et al. |
| 11,061,398 B2 | 6/2021 | Levinson et al. |
| 2015/0026244 A1 * | 1/2015 | Hato ..................... H04L 43/045 |
| | | 709/203 |
| 2015/0143395 A1 | 5/2015 | Reisman |
| 2015/0358667 A1 | 12/2015 | Bhatia et al. |
| 2016/0292434 A1 | 10/2016 | Nefedov et al. |
| 2017/0123421 A1 | 5/2017 | Kentley et al. |
| 2017/0316333 A1 | 11/2017 | Levinson et al. |
| 2018/0176318 A1 | 6/2018 | Rathod |
| 2018/0285840 A1 | 10/2018 | Hasan |
| 2019/0220755 A1 | 7/2019 | Carbune et al. |
| 2019/0227553 A1 | 7/2019 | Kentley-Klay et al. |
| 2020/0074024 A1 | 3/2020 | Levinson et al. |
| 2020/0089761 A1 * | 3/2020 | Guerra ............. G06F 16/90332 |
| 2020/0128067 A1 | 4/2020 | Guim Bernat et al. |
| 2020/0334077 A1 * | 10/2020 | Baldocchi ............. G06F 9/4881 |

* cited by examiner

SYSTEM AND METHOD FOR AN APPLICATION PROGRAMMING INTERFACE (API) SERVICE MODIFICATION

TECHNICAL FIELD

The present disclosure relates generally to computer networks, and more specifically to a system and method for an application programming interface (API) service modification.

BACKGROUND

Modern application platforms rely on application programming interface (API) services provided by various API hosting servers to perform various operations. APIs are used to carry out API services. APIs are often updated or modified, for example, to meet new objectives or improve the performance of the API service. To invoke an API service, an API request is sent to an API hosting server. The API hosting server processes the API request and generates an API response. The API hosting server returns the API response. The API responses may undergo modifications or updates as a result of updates made to the API service.

SUMMARY

The system described in the present disclosure is particularly integrated into a practical application of proactively detecting modifications made to application programming interface (API) services and implementing the detected modifications to future API requests. As, such, the disclosed system improves underlying operations of computer systems that send API requests and receive API responses, as described below.

In an example scenario, assume that a user (e.g., a developer) wants to invoke an API service provided by an API hosting server. The API service may include generating a user account number, opening a user profile, and/or any other API service. The user, from an API endpoint server, may send an API request to the API hosting server. The API hosting server returns an API response to the API endpoint server.

In some cases, the API response and/or the API service provided by the API hosting server may undergo changes, updates, and/or modifications (i.e., collectively referred to herein as "modifications") on the API hosting server side. For example, assume that the API request indicates to generate a 10-digit user account number. Also, assume that the received API response includes a 12-digit user account number as a result of a modification made in the process of generating user accounts in the API hosting server.

In conventional technology, there is no centralized monitoring system in place to proactively detect modifications made to the API responses (and/or API services). In contrast, the disclosed system is configured to detect modifications made to API responses (and/or API services).

To this end, the disclosed system generates a plurality of API sample requests based on content and metadata associated with historical API requests. In the example where a historical API request indicates to generate a user account number, the content associated with the historical API request may include a name, address, phone number, and/or any other information associated with the user. In this example, the metadata may include a header, a trailer, a data format, and a uniform resource locator (URL) associated with the content. The disclosed system generates the plurality of API sample requests by varying the content and the metadata associated with the historical API requests. In certain embodiments, the disclosed system may also use predefined data, such as names of cities, zip codes, and/or any other data in generating API sample requests.

The disclosed system sends the plurality of API sample requests to the API hosting server to determine whether any modification was made to any API response to any of the API sample requests. The API hosting server generates API responses and sends the generated API responses to the disclosed system.

The disclosed system evaluates the received API responses to determine whether each API response corresponds to an expected API response. Continuing the example above where the API request indicates to generate a user account number, assume that the received API response includes a 12-digit account number, while the expected API response includes a 10-digit user account number. Thus, the disclosed system determines that the received API response has been modified, i.e., the disclosed system detects a modification made to the received API response. Thus, the disclosed system updates (e.g., or modifies) future API requests associated with the same task (or API service, in this example generating a user account number), according to the detected modification.

In other words, the disclosed system proactively updates the process of generating future API requests according to the changes to the API service made by the API hosting server.

In the example where the API request indicated to generate a 10-digit account number, in response to detecting that the received API response includes a 12-digit account number, the disclosed system updates the future API requests to indicate to generate 12-digit account numbers.

In one embodiment, a system for API service modification comprises a memory and a processor. The memory is operable to store a plurality of historical API requests. The processor is operably coupled with the memory. The processor identifies content and metadata associated with the plurality of historical API requests.

The processor generates one or more API request samples based at least in part upon the content and the metadata. The processor sends the one or more API request samples to an API hosting server. The processor receives one or more API responses to the one or more API request samples from the API hosting server. The processor compares a received API response from among the one or more API responses with a counterpart expected API response. Each of the received API response and the counterpart expected API response is associated with an API request sample from among the one or more API request samples. The API request sample is associated with a particular task. The processor determines whether the received API response corresponds with the counterpart expected API response. The processor identifies a modification made to the received API response in response to determining that the received API response does not correspond with the counterpart expected API response. The processor updates future API requests associated with the particular task according to the modification made to the received API response.

The disclosed system provides several practical applications and technical advantages, which include: 1) technology that proactively detects modifications to API services and API responses made on an API hosting server side and updates future API requests according to the detected modifications; 2) technology that improves underlying operations of computer systems that send API requests and receive API responses; 3) technology that sends the API sample requests in batches so that the API hosting server is not overloaded with processing many API sample requests at a time; and 4) technology that determines whether a received API request is valid before processing it and generating a corresponding API request.

As such, the system described herein is integrated into a practical application of improving the underlying operations of computer systems that send API requests and receive API responses.

In some cases, due to overlooked modification(s) made to an API service and/or API response provided by an API hosting server, an out-of-date API request may be sent to the API hosting server and the API hosting server may not be able to process the out-of-date API request and may return an error message.

In some cases, the API hosting server may send an API response that does not correspond to (or match) the expected API response. This may lead to inconsistencies between previously received API responses and newly received API responses. In such cases, the disclosed system may have to undergo sudden and/or major software infrastructural modifications to accommodate the modifications made to the API service and/or newly received API responses.

In the example where the API response includes a 12-digit account number, but the expected API response includes a 10-digit account number, if this change is not proactively detected, a large number of API responses with 12-digit account numbers may arrive that are not consistent with the previously received API responses with 10-digit account numbers. This may lead to less-than-perfect infrastructural updates and consume processing and memory resources that could otherwise be minimized (or prevented) if the modifications were proactively detected using the disclosed system. For example, data format and column width of tables where these account numbers are stored in a database may need to be hastily updated to accommodate 12-digit account numbers.

The disclosed system may further be integrated into an additional practical application of improving network communication between the API endpoint server and the API hosting server. for example, by sending the API sample requests in batches, the network bandwidth between the API endpoint server and the API hosting server is not over-occupied by receiving a large number of API sample requests at once. This, in turn, provides an additional practical application of load balancing at the API hosting server.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
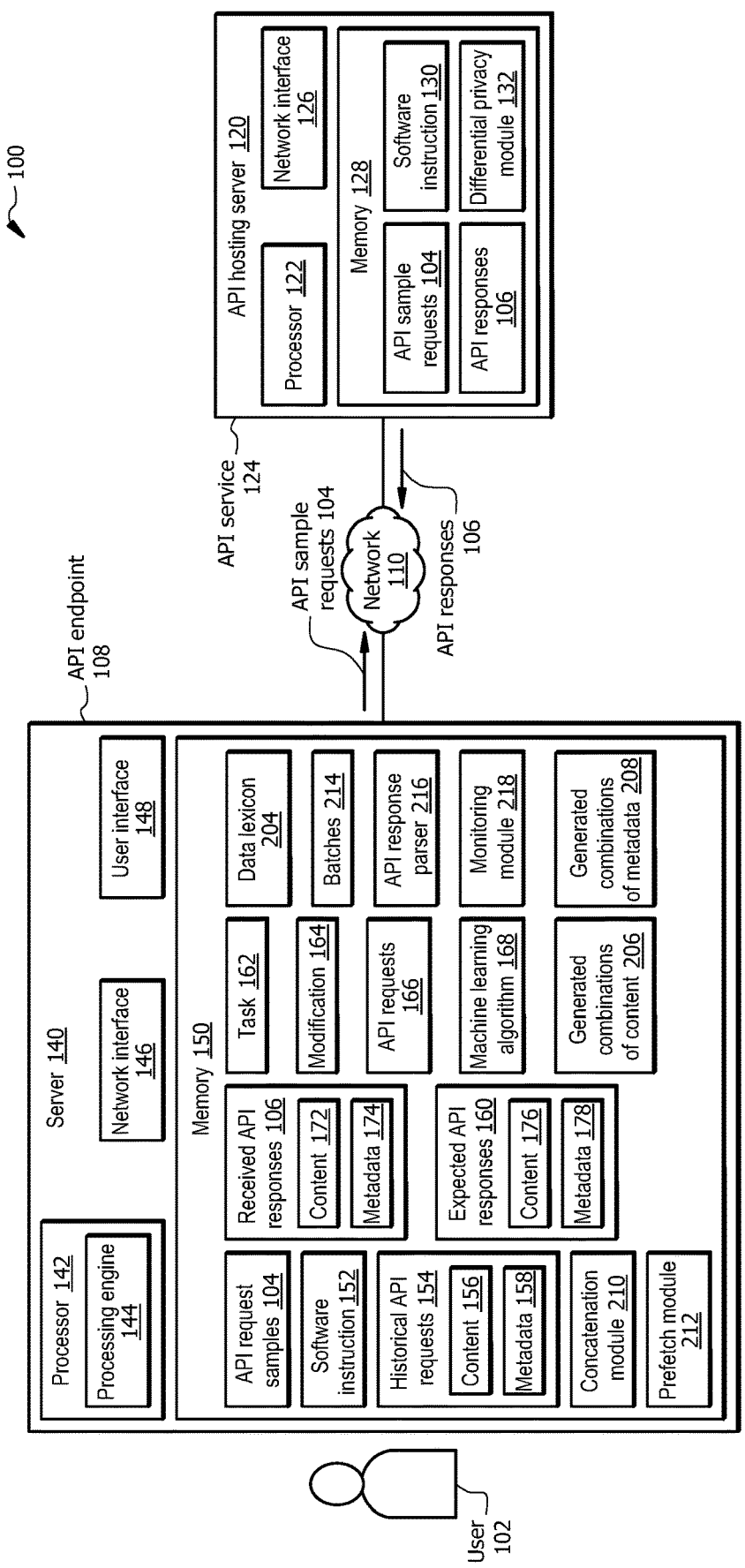
FIG. 1 illustrates an embodiment of a system configured to implement API service modification.
Figure 2:
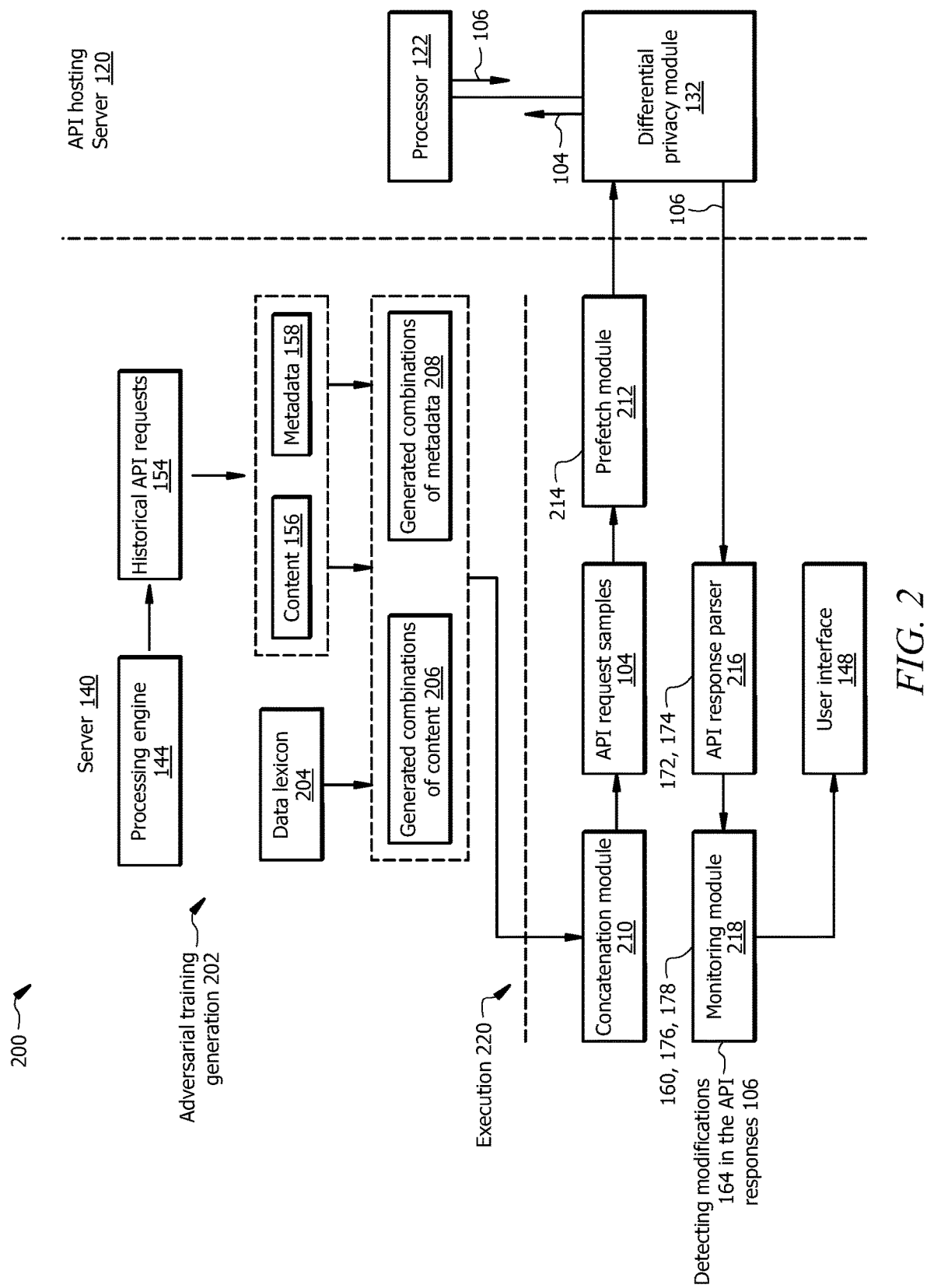
FIG. 2 illustrates an example operational flow of the system of FIG. 1.
Figure 3:
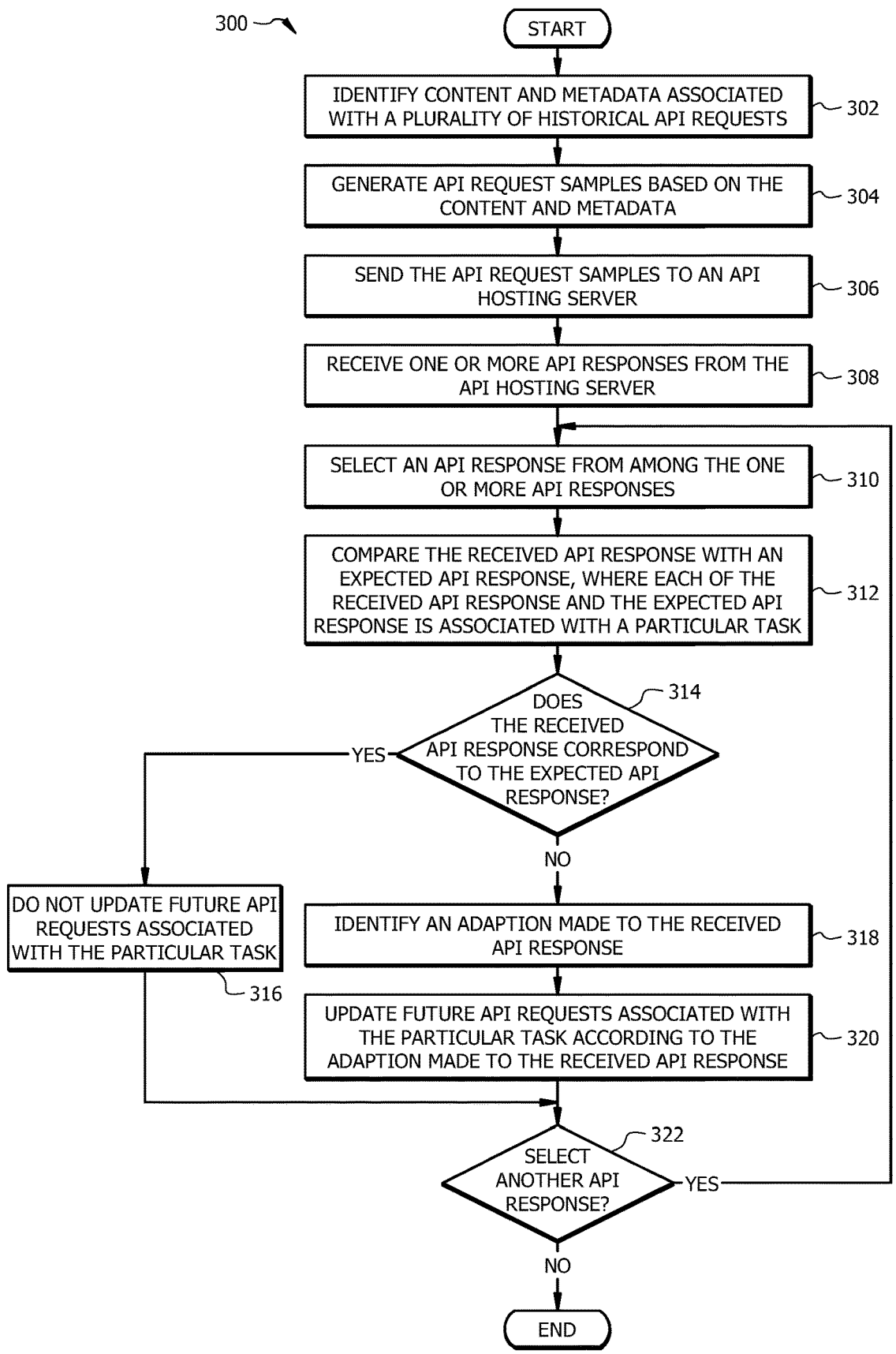
FIG. 3 illustrates an example flowchart of a method for implementing API service modification.

As described above, previous technologies fail to provide efficient and reliable solutions to detect modifications made to API services and implement API service modification. This disclosure provides various systems and methods to detect modifications made to API services and implement API service modification. FIG. 1, illustrates a system 100 configured to implement API service modification. FIG. 2 illustrates an operational flow 200 of the system 100 of FIG. 1. FIG. 3 illustrates a method 300 configured to implement API service modification.

Example System for Implementing API Service Modification

FIG. 1 illustrates one embodiment of a system 100 that is configured to detect modifications 164 made to API services 124 and/or API responses 106 and implement the detected modifications 164 to future API requests 166. In one embodiment, system 100 comprises a server 140. In some embodiments, system 100 further comprises a network 110 and an API hosting server 120. Network 110 enables communications among components of the system 100. In other embodiments, system 100 may not have all of the components listed and/or may have other elements instead of, or in addition to, those listed above.

Server 140 comprises a processor 142 in signal communication with a memory 150. Memory 150 stores software instructions 152 that when executed by the processor 142, cause the processor 142 to perform one or more functions described herein. For example, when the software instructions 152 are executed, the processor 142 executes a processing engine 144 to: 1) generate a plurality of API sample requests 104; 2) send the plurality of API sample requests 104 to the API hosting server 120; 3) receive a plurality of API responses 106 from the API hosting server 120; 4) evaluate whether there are any changes or modifications 164 made to the API services 124 and/or API responses 106 provided by the API hosting server 120; and 5) implement the detected modifications 164 to future API requests 166. The system 100 may be configured as shown, or in any other configuration.

System Components

Network

Network 110 may be any suitable type of wireless and/or wired network, including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 110 may be configured to support any suitable type of communication protocol as would be appreciated by one of ordinary skill in the art.

API Hosting Server

API hosting server 120 is generally a device that is configured to process data and communicate with computing devices (e.g., the server 140), databases, systems, etc., via the network 110. The API hosting server 120 is generally configured to generate API responses 106 in response to receiving the API request samples 104 and/or API requests 166. This operation is described further below in conjunction with the operational flow 200 of the system 100 described in FIG. 2 and method 300 described in FIG. 3.

The API hosting server 120 comprises a processor 122 in signal communication with a network interface 126 and a memory 128. Memory 128 stores software instructions 130 that when executed by the processor 122, cause the API hosting server 120 to perform one or more functions described herein. For example, when the software instructions 130 are executed, the API hosting server 120 generates API responses 106 in response to receiving the API sample requests 104. The API hosting server 120 may be configured as shown, or in any other configuration.

Processor 122 comprises one or more processors operably coupled to the memory 128. The processor 122 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). The processor 122 may be a programmable logic device, a microcontroller, a microprocessor, or any suitable combination of the preceding. The processor 122 is communicatively coupled to and in signal communication with the network interface 126 and memory 128. The one or more processors are configured to process data and may be implemented in hardware or software. For example, the processor 122 may be 8-bit, 16-bit, 32-bit, 64-bit, or of any other suitable architecture. The processor 122 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute software instructions 130 to implement the functions disclosed herein, such as some or all of those described with respect to FIGS. 1-3. In some embodiments, the function described herein is implemented using logic units, FPGAs, ASICs, DSPs, or any other suitable hardware or electronic circuitry.

Network interface 126 is configured to enable wired and/or wireless communications (e.g., via the network 110). The network interface 126 is configured to communicate data between the API hosting server 120 and other network devices, systems, or domain(s). For example, the network interface 126 may comprise a WIFI interface, a local area network (LAN) interface, a wide area network (WAN) interface, a modem, a switch, or a router. The processor 122 is configured to send and receive data using the network interface 126. The network interface 126 may be configured to use any suitable type of communication protocol.

Memory 128 may be volatile or non-volatile and may comprise a read-only memory (ROM), random-access memory (RAM), ternary content-addressable memory (TCAM), dynamic random-access memory (DRAM), and static random-access memory (SRAM). Memory 128 may be implemented using one or more disks, tape drives, solid-state drives, and/or the like. Memory 128 is operable to store the software instructions 130, API sample requests 104, API responses 106, differential privacy module 132, and/or any other data or instructions. The software instructions 130 may comprise any suitable set of instructions, logic, rules, or code operable to execute the processor 122.

Server

Server 140 is generally any device that is configured to process data and communicate with computing devices (e.g., API hosting server 120), databases, systems, etc., via the network 110. The server 140 is generally configured to oversee operations of the processing engine 144. The operations of the processing engine 144 are described further below in conjunction with the operational flow 200 of the system 100 described in FIG. 2 and method 300 described in FIG. 3. The server 140 is associated with an API endpoint 108 where API request samples 104 are originated.

The server 140 comprises the processor 142 in signal communication with a network interface 146, a user interface 148, and memory 150. The server 140 may be configured as shown, or in any other configuration.

Processor 142 comprises one or more processors operably coupled to the memory 150. The processor 142 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). The processor 142 may be a programmable logic device, a microcontroller, a microprocessor, or any suitable combination of the preceding. The processor 142 is communicatively coupled to and in signal communication with the network interface 146, user interface 148, and memory 150. The one or more processors are configured to process data and may be implemented in hardware or software. For example, the processor 142 may be 8-bit, 16-bit, 32-bit, 64-bit or of any other suitable architecture. The processor 142 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute software instructions 152 to implement the functions disclosed herein, such as some or all of those described with respect to FIGS. 1-3. In some embodiments, the function described herein is implemented using logic units, FPGAs, ASICs, DSPs, or any other suitable hardware or electronic circuitry.

Network interface 146 is configured to enable wired and/or wireless communications (e.g., via the network 110). The network interface 146 is configured to communicate data between the server 140 and other network devices, systems, or domain(s). For example, the network interface 146 may comprise a WIFI interface, a local area network (LAN) interface, a wide area network (WAN) interface, a modem, a switch, or a router. The processor 142 is configured to send and receive data using the network interface 146. The network interface 146 may be configured to use any suitable type of communication protocol.

Memory 150 may be volatile or non-volatile and may comprise a read-only memory (ROM), random-access memory (RAM), ternary content-addressable memory (TCAM), dynamic random-access memory (DRAM), and static random-access memory (SRAM). Memory 150 may be implemented using one or more disks, tape drives, solid-state drives, and/or the like. Memory 150 is operable to store the software instructions 152, historical API requests 154, API request samples 104, concatenation module 210, prefetch module 212, received PAI responses 106, expected API responses 160, generated combinations of content 206, generated combination of metadata 208, API requests 166, machine learning algorithm 168, task 162, modifications 164, data lexicon 204, batches 214, API response parser 216, monitoring module 218, and/or any other data or instructions. The software instructions 152 may comprise any suitable set of instructions, logic, rules, or code operable to execute the processor 142.

In an example scenario, assume that a user 102 (e.g., a developer) wants to invoke an API service 124 provided by the API hosting server 120. In some examples, the API service 124 may include generating a user account number for a particular client of an organization associated with the server 140, open a new user profile for a particular client, among other API services 124. The user 102, from the server 140, may send an API request 166 to the API hosting server 120, where the API request 166 indicates to provide the API service 124. In the example of generating a user account number, the user 102 may send an API request 166 that indicates to generate a user account number.

The API hosting server 120 processes the API request 166 and generates an API response 106 to the API request 166. The API response 106 may include the API service 124. In the example where the API request 166 indicates to generate a user account number, the API response 106 may include the generated user account number.

In some cases, the API hosting server 120 may have modified or updated the data format associated with the content and/or metadata associated with the API service 124 and/or the API responses 106. For example, assume that the API hosting server 120 has been using a particular data format for the content and/or metadata for providing the API service 124, thus server 140 has been receiving API responses 106 with the particular data format associated with the content and/or metadata. In the example of generating a user account number as an API sample request 104, the server 140 may have been receiving account numbers with 10-digits according to historical API responses 106 that include 10-digits account numbers. Thus, it is expected that the API response 106 to include a 10-digit account number. However, the process of generating a user account number may have been modified in the API hosting server 120 such that 12-digit account numbers are generated from now on in response to receiving API sample requests 104 to generate an account number. In such cases, the received API response 106 may not correspond (or match) the expected or historical API responses 106. The server 14 may not be aware of such changes in the API responses 106. In some cases, this may lead to not receiving an API response 106 due to incompatibility between an API request 104 and requirements of the API service 124 or receiving an error message that indicates the API response 106 is not compatible with the requirements of the API service 124.

Thus, the disclosed system 100 is configured to detect such changes or modifications 164 between the received API responses 106 and counterpart expected API responses 160. The disclosed system 100 is configured to detect any change or modification 164 made to the API responses 106, where the API responses 106 may be associated with any number of API services 124. In response to detecting any modification 164 made to the API responses 106, the disclosed system 100 is configured to implement the detected modifications 164 to future API requests 166 such that the future API requests 166 are modified according to the modifications 164 made to the process of providing their corresponding API services 124.

Processing Engine

Processing engine 144 may be implemented by the processor 142 executing the software instructions 152, and is generally configured to: 1) generate a plurality of API sample requests 104; 2) send the plurality of API sample requests 104 to the API hosting server 120; 3) receive a plurality of API responses 106 from the API hosting server 120; 4) evaluate whether there is any changes or modifications 164 made to the API services 124 and/or API responses 106 provided by the API hosting server 120; and 5) implement the detected modifications 164 to future API requests 166. These operations are described in detail further below in conjunction with the operational flow 200 described in FIG. 2 and method 300 described in FIG. 3. The corresponding description below describes a brief explanation of the operations of the processing engine 144.

The processing engine 144 accesses historical API requests 154. The processing engine 144 generates one or more API request samples 104 based on content 156 and metadata 158 associated with the historical API requests 154. The processing engine 144 sends the API request samples 104 to the API hosting server 120. The API hosting server 120 generates API responses 106 to the received API request samples 104. The API hosting server 120 sends the API responses 106 to the server 140.

The processing engine 144 parses the API responses 106 and detects content 172 and metadata 174 associated with the API responses 106. The processing engine 144 compares each received API response 106 with a counterpart expected API response 160, where each received API response 106 and the counterpart expected API response 160 is associated with the same API request sample 104 and/or task 162, such as generating a user account number.

The processing engine 144 determines whether a received API response 106 corresponds with its counterpart expected API response 160. If the processing engine 144 determines that the received API response 106 does not correspond with the counterpart expected API response 160, the processing engine 144 identifies the difference between the received API response 106 and the counterpart expected API response 160. In other words, the processing engine 144 identifies an modification 164 made to the received API response 106, where the modification 164 is made to the received API response 106 by the API hosting server 120.

In response, the processing engine 144 may update future API requests 166 associated with the particular task 162 according to the modification 164 made to the received API response 106. The operation of the disclosed system 100 is described in conjunction with the operational flow 200 described in FIG. 2.

Operational Flow

Generating Combinations of Content and Metadata

The operational flow 200 may begin at an adversarial training generation step 202 where the processing engine 144 accesses the historical API requests 154, e.g., stored in the memory 150 (see FIG. 1).

Each historical API request 154 may include content 156 and metadata 158. For example, the content 156 associated with a historical API request 154 may include the data that is requested in the historical API request 154. In an example historical API request 154 that requests to generate an user account number for a user, the content 156 may include a name, a unique identifier number, phone number, address, user account number, and/or the like. The metadata 158 associated with a historical API request 154 may include one or more a header, a trailer, an URL, a data format associated with the content 156, and/or the like.

The processing engine 144 identifies the content 156 and the metadata 158 associated with the historical API requests 154. The processing engine 144 uses this information to generate the API sample requests 104. One reason for generating API request samples 104 is to generate different combinations or different possibilities of content 206 and metadata 208. Each combination of content 206 and metadata 208 corresponds to one API request sample 104. In this manner, the processing engine 144 is able to detect any modification 164 made to any aspect of the process of generating API responses 106 compared to expected API responses 160.

To generate API sample requests 104, the processing engine 144 may generate combinations of content 206 and combinations of metadata 208. In this process, the processing engine 144 may implement a machine learning algorithm 168, such as support vector machine, neural network, random forest, k-means clustering, linear regression, non-linear regression, etc.

In one embodiment, the processing engine 144 may implement a random data generator for generating combinations of content 206 and combinations of metadata 208. In this process, the processing engine 144 may vary the content 156 and the metadata 158 among one or more API sample requests 104.

In the example of an API sample request 104 for generating a user account number for a user, to generate the combinations of content 206, the processing engine 144 may vary different data fields of the content 156, such as names, addresses, phone numbers, use account numbers, number of digits used in the user account numbers, etc. associated with the historical API requests 154.

In the example of an API sample request 104 for generating a user account number for a user, to generate the combinations of metadata 208, the processing engine 144 may vary different data fields of the metadata 158, such as headers, trailers, URLs, data formats, etc. associated with the historical API requests 154.

In some cases, a data field in content 206 and/or in metadata 158 may not be generated synthetically and/or randomly. For example, zip codes associated with addresses (in content 156) may be predefined and not generated synthetically and/or randomly. In another example, names of cities associated with addresses (in content 156) may be predefined and not generated synthetically and/or randomly. In another example, the data format in metadata 158 may be predefined and not generated synthetically and/or randomly. In such cases, the processing engine 144 may search in the data lexicon 204 that includes data that is predefined and/or not generated synthetically and/or randomly. The processing engine 144 may fetch such data from the data lexicon 204 and use it in the various combinations of content 206 and various combinations of metadata 208. At the end of the adversarial training generation step 202, the processing engine 144 has generated combinations of content 206 and combinations of metadata 208.

Generating API Sample Requests

At the execution operation 220, the processing engine 144 feeds the generated combinations of content 206 and combinations of metadata 208 to the concatenation module 210.

The concatenation module 210 may be implemented by the processor 142 executing the software instructions 152, and is generally configured to generate the API request samples 104. In this process, the concatenation module 210 may concatenate each generated content 206 with each generated metadata 208. Each combination of generated content 206 with a generated metadata 208 may represent one of the API request samples 104. The concatenation module 210 may feed the API request samples 104 to the prefetch module 212.

The prefetch module 212 may be implemented by the processor 142 executing the software instructions 152, and is generally configured to place the API request samples 104 in batches 214. Each batch 214 may include fifty, one-hundred, or any other number of API request samples 104. API request samples 104 in each batch 214 may be associated with a particular API service 124, e.g., generating user account numbers, etc.

The prefetch module 212 may determine whether the API sample requests 104 are compatible with the API services 124 of the destination API hosting server 120, so that no error message is expected to be received from the API hosting server 120. If the prefetch module 212 determines that the API sample requests 104 (in a first batch 214) are valid and compatible with the desired API service 124, the prefetch module 212 communicates the API sample requests 104 (in a first batch 214) to the API hosting server 120.

In one embodiment, while the API hosting server 120 is processing the API sample requests 104 (in the first batch 214), the prefetch module 212 may prefetch and prepare the next batch 214 of API sample requests 104 to send to the API hosting server 120. The prefetch module 212 may continue this process for the next batches 214.

Generating API Responses

The API hosting server 120 receives the API sample requests 104 at the differential privacy module 132. The differential privacy module 132 may be implemented by the processor 122 executing the software instructions 130, and is generally configured to determine whether each of the API sample requests 104 is valid.

In one embodiment, the differential privacy module 132 may determine whether an API sample request 104 is valid by determining whether it has originated from a pre-authenticated endpoint. If the differential privacy module 132 determines that an API sample request 104 is valid, it sends the API sample request 104 to the processor 122 for processing. Otherwise, in one embodiment, the differential privacy module 132 may not forward the API sample request 104 to the processor 122. In another embodiment, the differential privacy module 132 may return an error message to an originator of the invalid API sample request 104. Thus, if the API sample request 104 is determined to be invalid, the API hosting server 120 may not generate an API response for it.

In this manner, the system 100 of FIG. 1 may be integrated into a practical application of improving information security and data loss prevention. For example, a bad actor may attempt to gain unauthorized access to the API hosting server 120 by sending an API request 104. By detecting that the API sample request 104 is invalid, data stored in the API hosting server 120 may be kept secure from unauthorized access.

The processor 122 receives the validated API sample requests 104 and process them. The processor 122 generates an API response 106 for each validated API sample request 104. For example, if the API sample request 104 includes a request to generate a user account number, the API response 106 to this API sample request 104 includes the generated user account number. The processor 122 communicates the API responses 106 to the differential privacy module 132.

Receiving API Responses

The differential privacy module 132 communicates the API responses 106 to the prefetch module 212. The prefetch module 212 may be implemented by the processor 142 executing the software instruction 152, and is generally configured to parse each API response 106.

In one embodiment, the prefetch module 212 implemented a text parsing algorithm, such as natural language processing. In one embodiment, the prefetch module 212 may implement object-oriented programming and treat each data field in the API responses 106 as an object.

The prefetch module 212 may include a content parser and a metadata parser. The content parser may parse the contents 172 of the API responses 106. The metadata parser may parse the metadata 174 of the API responses 106.

The prefetch module 212 forwards the content 172 and metadata 174 to the monitoring module 218.

Determining Whether any Modification is Made to API Responses

The monitoring module 218 may be implemented by the processor 142 executing the software instructions 152, and is generally configured to determine whether each API response 106 is modified or changed compared to historical or expected counterpart API response 160.

In other words, the monitoring module 218 determines whether the API hosting server 120 has made any modification 164 to each API response 106 compared to the expected counterpart API response 160. Each of the API response 106 and its expected counterpart API response 160 is associated with the same API sample request 104 that is associated with a particular task 162.

In this process, the monitoring module 218 may compare each API response 106 with its counterpart expected API response 160. The monitoring module 218 may determine whether each API response 106 corresponds with its counterpart expected API response 160. The monitoring module 218 may parse a first content 172 associated with an API response 106, and parse a second content 176 associated with the expected API response 160 that is the counterpart to the API response 106, e.g., by implementing a text parsing algorithm.

The monitoring module 218 may compare the first content 172 associated with the API response 106 with the second content 176 associated with the counterpart expected API response 160. The monitoring module 218 determines whether the first content 172 corresponds to the second content 176.

If the monitoring module 218 determines that the first content 172 corresponds to the second content 176, the monitoring module 218 may determine that the API response 106 corresponds to its counterpart expected API response 160. If the monitoring module 218 determines that the first content 172 does not correspond to the second content 176, the monitoring module 218 determines that the API response 106 is modified or has a modification 164 compared with its expected API response 160.

Further in this process, the monitoring module 218 may parse a first metadata 174 associated with an API response 106, and parse a second metadata 178 associated with the expected API response 160 that is the counterpart to the API response 106, e.g., by implementing a text parsing algorithm.

The monitoring module 218 may compare the first metadata 174 associated with the API response 106 with the second metadata 178 associated with the counterpart expected API response 160. The monitoring module 218 determines whether the first metadata 174 corresponds to the second metadata 178.

If the monitoring module 218 determines that the first metadata 174 corresponds to the second metadata 178, the monitoring module 218 may determine that the API response 106 corresponds to its counterpart expected API response 160. If the monitoring module 218 determines that the first metadata 174 does not correspond to the second metadata 178, the monitoring module 218 determines that the API response 106 is modified or has a modification 164 compared with its expected API response 160.

In the example where the API request 104 indicates to generate a user account number, assume that the expected API response 160 includes a 10-digit user account number. Also, assume that the received API response 106 to generate a user account number includes a 12-digit account number. In this example, the monitoring module 218 determines that the received API request 104 does not correspond with its counterpart expected API response 160. Thus, the monitoring module 218 identifies the modification 164 made in generating the API response 106.

The monitoring module 218 may detect any modification 164 made to the API responses 106, such as changes to contents and/or metadata, such as data formats, data fields, headers, trailers, URLs, etc.

In one embodiment, in response to detecting a modification 164 in an API response 106 associated with a particular task 162, the processing engine 144 may update future API requests 166 associated with the particular task 162 according to the modification 164 made to the API response 106, such that future API responses 106 associated with the particular task 162 may correspond to the expected API responses 160 associated with the particular task 162.

In one embodiment, the monitoring module 218 forwards the detected modifications 164 to the user interface 148. The user interface 148 may include a dashboard, a platform, a display window, and/or the like.

The user 102 may view the modifications 164 via the user interface 148 and confirm, override, or change changes that the processing engine 144 makes for the future API responses 106.

Example method for implementing API service modification

FIG. 3 illustrates an example flowchart of a method 300 for implementing API service modification. Modifications, additions, or omissions may be made to method 300. Method 300 may include more, fewer, or other steps. For example, steps may be performed in parallel or in any suitable order. While at times discussed as the system 100, processor 142, processing engine 144, API hosting server 120, processor 122, or components of any of thereof performing steps, any suitable system or components of the system may perform one or more steps of the method 300. For example, one or more steps of method 300 may be implemented, at least in part, in the form of software instructions 152 of FIG. 1, stored on non-transitory, tangible, machine-readable media (e.g., memory 150 of FIG. 1) that when run by one or more processors (e.g., processor 142 of FIG. 1) may cause the one or more processors to perform steps 302-322.

Method 300 begins at step 302 where the processing engine 144 identifies content 156 and metadata 158 associated with a plurality of historical API requests 154. The content 156 associated with a historical API request 154 may include data that is requested in the historical API request 154. The metadata 158 associated with a historical API request 104 may include one or more of a header, a trailer, a data format, a URL associated with the content 156.

At step 304, the processing engine 144 generates API request samples 104 based on the content 156 and metadata 158. In this process, the processing engine 144 may implement a machine learning algorithm 168 to generate various combinations of content 206 and various combinations of metadata 208. The processing engine 144 combines the various combinations of content 206 and various combinations of metadata 208 via the concatenation module 210, similar to that described in FIG. 2.

At step 306, the processing engine 144 sends the API request samples 104 to the API hosting server 120.

At step 308, the processing engine 144 receives one or more API responses 106 from the API hosting server 120.

At step 310, the processing engine 144 selects an API response 106 from among the one or more API responses 106. The processing engine 144 may iteratively select an API response 106 from among the one or more API responses 106 until no API response 106 is left for evaluation.

At step 312, the processing engine 144 compares the received API response 106 with an expected API response 160, where each of the received API response 106 and the expected API response 160 is associated with a particular task 162. In other words, each of the received API response 106 and the expected API response 160 is associated with the same task 162. In this process, the processing engine 144 may implement the prefetch module 212 and monitoring module 218 to compare the received API response 106 with an expected API response 160, similar to that described in FIG. 2.

At step 314, the processing engine 144 determines whether the received API response 106 corresponds to the expected API response 160. In this process, the processing engine 144 (e.g., via the monitoring module 218) may determine whether there is any difference between the received API response 106 and the expected API response 160. If the processing engine 144 determines that the received API response 106 corresponds to the expected API response 160, method 300 proceeds to step 316. Otherwise, method 300 proceeds to step 318.

At step 316, the processing engine 144 does not update future API requests 166 associated with the particular task 162.

At step 318, the processing engine 144 identifies a modification 164 made to the received API response 106. In this process, the processing engine 144 identifies the differences between the received API response 106 and the expected API response 160. Examples of various modifications 164 are described in FIGS. 1 and 2.

At step 320, the processing engine 144 modifies future API requests 166 associated with the particular task 162 according to the modification 164 made to the received API response 106. For example, the processing engine 144 may update the future API requests 166 associated with the particular task 162 according to the modifications 164 so that the future API responses 106 (associated with the particular task 162) correspond to the expected API responses 160 (associated with the particular task 162).

In one embodiment, the processing engine 144 (e.g., via the monitoring module 218) may generate software instructions to make the modifications 164 to the future API requests 166. For example, if the detected modification 164 made to the API response 106 is that 12-digit account number is generated compared to 10-digit user accounts in expected API response 160, the processing engine 144 may generate software instructions to request for 12-digit account numbers in future API requests 166.

The monitoring module 218 may forward the detected modification(s) 164 and the software instructions to the user interface 148. The user 102 may review the modification(s) 164 and the software instructions and confirm, override, or change the software instructions.

At step 322, the processing engine 144 determines whether to select another API response 106. The processing engine 144 may determine to select another API response 106 if at least one API response 106 is left for evaluation. If the processing engine 144 determines to select another API response 106, method 300 returns to step 310. Otherwise, method 300 terminates.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system for application programming interface (API) service modification comprising:
a memory operable to store a plurality of historical API requests; and
a processor, operably coupled with the memory, and configured to:
identify content and metadata associated with the plurality of historical API requests;
generate one or more API request samples based at least in part upon the content and the metadata;
send the one or more API request samples to an API hosting server;
receive one or more API responses to the one or more API request samples from the API hosting server;
compare a received API response from among the one or more API responses with a counterpart expected API response, wherein:
each of the received API response and the counterpart expected API response is associated with an API request sample from among the one or more API request samples; and
the API request sample is associated with a particular task;
determine whether the received API response corresponds with the counterpart expected API response;
in response to determining that the received API response does not correspond with the counterpart expected API response:
identify a modification made to the received API response; and update future API requests associated with the particular task according to the modification made to the received API response.

2. The system of claim 1, wherein generating the one or more API request samples based at least in part upon the identified content and the identified metadata comprises varying the content and the metadata among the one or more API request samples.

3. The system of claim 1, wherein:
the content comprises data that is requested in at least one historical API request from among the plurality of historical API requests, wherein the data comprises a user account; and
the metadata comprises one or more of a data format, a header, a trailer, and a uniform resource locator (URL) associated with the content.

4. The system of claim 1, wherein the particular task comprises generating a user account.

5. The system of claim 1, wherein determining whether the received API response corresponds with the counterpart expected API response comprises:
parsing a first content associated with the received API response;
parsing a second content associated with the counterpart expected API response;
comparing the first content with the second content;
determining whether the first content corresponds to the second content; and
in response to determining that the first content does not correspond to the second content, determine that the received API response does not correspond to the counterpart expected API response.

6. The system of claim 1, wherein determining whether the received API response corresponds with the counterpart expected API response comprises:
parsing a first metadata associated with the received API response;
parsing a second metadata associated with the counterpart expected API response;
determining whether the first metadata corresponds to the second metadata; and
in response to determining that the first metadata does not correspond to the second metadata, determine that the received API response does not correspond to the counterpart expected API response.

7. The system of claim 1, further comprising the API hosting server that comprises a second processor configured to:
receive the one or more API request samples;
for each API request sample from among the one or more API request samples:
determine whether the API request sample is valid;
in response to determining that the API request sample is valid, generate an API response to the API request sample; and
in response to determining that the API request sample is not valid, do not generate the API response to the API request sample.

8. The system of claim 7, wherein determining whether the API request sample is valid comprises determining whether the API request sample is originated from pre-authenticated endpoint.

9. A method for application programming interface (API) service modification comprising:
identifying content and metadata associated with a plurality of historical API requests;
generating one or more API request samples based at least in part upon the content and the metadata;
sending the one or more API request samples to an API hosting server;
receiving one or more API responses to the one or more API request samples from the API hosting server;
comparing a received API response from among the one or more API responses with a counterpart expected API response, wherein:
each of the received API response and the counterpart expected API response is associated with an API request sample from among the one or more API request samples; and
the API request sample is associated with a particular task;
determining whether the received API response corresponds with the counterpart expected API response;
in response to determining that the received API response does not correspond with the counterpart expected API response:
identifying a modification made to the received API response; and
updating future API requests associated with the particular task according to the modification made to the received API response.

10. The method of claim 9, wherein generating the one or more API request samples based at least in part upon the identified content and the identified metadata comprises varying the content and the metadata among the one or more API request samples.

11. The method of claim 9, wherein:
the content comprises data that is requested in at least one historical API request from among the plurality of historical API requests, wherein the data comprises a user account; and
the metadata comprises one or more of a data format, a header, a trailer, and a uniform resource locator (URL) associated with the content.

12. The method of claim 9, wherein the particular task comprises generating a user account.

13. The method of claim 9, wherein determining whether the received API response corresponds with the counterpart expected API response comprises:
parsing a first content associated with the received API response;
parsing a second content associated with the counterpart expected API response;
comparing the first content with the second content;
determining whether the first content corresponds to the second content; and
in response to determining that the first content does not correspond to the second content, determine that the received API response does not correspond to the counterpart expected API response.

14. The method of claim 9, wherein determining whether the received API response corresponds with the counterpart expected API response comprises:
parsing a first metadata associated with the received API response;
parsing a second metadata associated with the counterpart expected API response;
determining whether the first metadata corresponds to the second metadata; and
in response to determining that the first metadata does not correspond to the second metadata, determine that the received API response does not correspond to the counterpart expected API response.

15. The method of claim 9, further comprising:

receiving, by the API hosting server, the one or more API request samples;

for each API request sample from among the one or more API request samples:

determining, by the API hosting server, whether the API request sample is valid;

in response to determining that the API request sample is valid, generating, by the API hosting server, an API response to the API request sample; and in response to determining that the API request sample is not valid, do not generate, by the API hosting server, the API response to the API request sample.

16. A non-transitory computer-readable medium that stores executable instructions, that when executed by a processor, cause the processor to:

identify content and metadata associated with a plurality of historical API requests;

generate one or more API request samples based at least in part upon the content and the metadata;

send the one or more API request samples to an API hosting server;

receive one or more API responses to the one or more API request samples from the API hosting server;

compare a received API response from among the one or more API responses with a counterpart expected API response, wherein:

each of the received API response and the counterpart expected API response is associated with an API request sample from among the one or more API request samples; and the API request sample is associated with a particular task;

determine whether the received API response corresponds with the counterpart expected API response;

in response to determining that the received API response does not correspond with the counterpart expected API response:

identify a modification made to the received API response; and update future API requests associated with the particular task according to the modification made to the received API response.

17. The non-transitory computer-readable medium of claim 16, wherein generating the one or more API request samples based at least in part upon the identified content and the identified metadata comprises varying the content and the metadata among the one or more API request samples.

18. The non-transitory computer-readable medium of claim 16, wherein:

the content comprises data that is requested in at least one historical API request from among the plurality of historical API requests, wherein the data comprises a user account; and the metadata comprises one or more of a data format, a header, a trailer, and a uniform resource locator (URL) associated with the content.

19. The non-transitory computer-readable medium of claim 16, wherein the particular task comprises generating a user account.

20. The non-transitory computer-readable medium of claim 16, wherein determining whether the received API response corresponds with the counterpart expected API response comprises:

parsing a first content associated with the received API response;

parsing a second content associated with the counterpart expected API response;

comparing the first content with the second content;

determining whether the first content corresponds to the second content; and in response to determining that the first content does not correspond to the second content, determine that the received API response does not correspond to the counterpart expected API response.

\* \* \* \* \*